(12) United States Patent
Cavallin et al.

(10) Patent No.: US 10,703,540 B2
(45) Date of Patent: *Jul. 7, 2020

(54) METHODS AND MATERIALS FOR THE FUNCTIONALIZATION OF POLYMERS AND COATINGS INCLUDING FUNCTIONALIZED POLYMER

(71) Applicant: Valspar Sourcing, Inc., Minneapolis, MN (US)

(72) Inventors: Carl Cavallin, Needville, TX (US); Charles Skillman, Zelienople, PA (US); Richard H. Evans, Wexford, PA (US); Larry B Brandenburger, Lino Lakes, MN (US); T. Howard Killilea, North Oaks, MN (US); George W. O'Dell, Lawson, MO (US)

(73) Assignee: Valspar Sourcing, Inc., Minneapolis, MN (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/483,082

(22) Filed: Apr. 10, 2017

(65) Prior Publication Data

US 2017/0313473 A1  Nov. 2, 2017

Related U.S. Application Data

(63) Continuation of application No. 13/968,981, filed on Aug. 16, 2013, now Pat. No. 9,650,176, which is a continuation-in-part of application No. PCT/US2013/026322, filed on Feb. 15, 2013.

(60) Provisional application No. 61/600,430, filed on Feb. 17, 2012.

(51) Int. Cl.
| | |
|---|---|
| *B65D 25/14* | (2006.01) |
| *B32B 15/095* | (2006.01) |
| *B32B 15/09* | (2006.01) |
| *B32B 15/082* | (2006.01) |
| *B32B 15/08* | (2006.01) |
| *B32B 15/085* | (2006.01) |
| *B32B 15/098* | (2006.01) |
| *C09D 201/08* | (2006.01) |
| *C09D 167/06* | (2006.01) |
| *C08F 8/00* | (2006.01) |
| *C09D 133/04* | (2006.01) |

(52) U.S. Cl.
CPC .............. *B65D 25/14* (2013.01); *B32B 15/08* (2013.01); *B32B 15/082* (2013.01); *B32B 15/085* (2013.01); *B32B 15/09* (2013.01); *B32B 15/095* (2013.01); *B32B 15/098* (2013.01); *C08F 8/00* (2013.01); *C09D 133/04* (2013.01); *C09D 167/06* (2013.01); *C09D 201/08* (2013.01); *Y10T 428/1355* (2015.01)

(58) Field of Classification Search
CPC ..... B32B 15/08; B32B 15/082; B32B 15/085; B32B 15/09; B32B 15/095; B32B 15/098; B65D 25/14; C08F 8/00; C09D 133/04; C09D 167/06; C09D 201/08; Y10T 428/1355

See application file for complete search history.

(56) References Cited

U.S. PATENT DOCUMENTS

| | | | |
|---|---|---|---|
| 3,297,557 A | 1/1967 | Huggard | |
| 3,511,816 A * | 5/1970 | Dickakian | C08C 19/28 524/389 |
| 4,147,679 A | 4/1979 | Scriven et al. | |
| 4,692,491 A | 9/1987 | Ranka et al. | |
| 5,252,682 A | 10/1993 | Bayha | |
| 5,300,569 A * | 4/1994 | Drake | C08C 19/28 525/78 |
| 5,407,784 A * | 4/1995 | Berrier | C08C 19/28 430/270.1 |
| 5,420,227 A | 5/1995 | Pfeil et al. | |
| 6,020,441 A | 2/2000 | Zeller et al. | |
| 6,730,361 B2 | 5/2004 | Parekh et al. | |
| 6,893,678 B2 | 5/2005 | Hirose et al. | |
| 7,803,415 B2 | 9/2010 | Kiefer-Liptak et al. | |
| 8,133,557 B2 | 3/2012 | Parekh et al. | |
| 8,231,951 B2 | 7/2012 | Parekh et al. | |
| 8,357,749 B2 | 1/2013 | Malotky et al. | |
| 8,367,171 B2 | 2/2013 | Stenson et al. | |
| 8,449,960 B2 | 5/2013 | Skillman et al. | |
| 8,574,672 B2 | 11/2013 | Doreau et al. | |
| 8,663,765 B2 | 3/2014 | Skillman et al. | |

(Continued)

FOREIGN PATENT DOCUMENTS

| | | |
|---|---|---|
| CN | 1211261 A | 3/1999 |
| CN | 1753919 A | 3/2006 |

(Continued)

OTHER PUBLICATIONS

Ricon 130 Data Sheet, May 5, 2010. (Year: 2010).*

(Continued)

*Primary Examiner* — Christopher M Rodd

(74) *Attorney, Agent, or Firm* — Merchant & Gould P.C.

(57) ABSTRACT

The disclosure provides a functionalized polymer for use in coating compositions and a method for making the functionalized polymer. In some embodiments, the functionalized polymer is a water-dispersible polymer, more preferably a water-dispersible polyester polymer, having one or more side groups including one or more salt groups. Packaging containers (e.g., food or beverage cans) comprising the functionalized polymer and methods of making such containers are also provided.

18 Claims, No Drawings

(56) References Cited

U.S. PATENT DOCUMENTS

| | | |
|---|---|---|
| 2003/0212296 A1 | 11/2003 | Frings et al. |
| 2004/0167252 A1 | 8/2004 | Melchiors et al. |
| 2005/0196629 A1 | 9/2005 | Bariatinsky et al. |
| 2007/0203261 A1* | 8/2007 | Narayan .......... C08K 9/08 523/205 |
| 2010/0051862 A1 | 3/2010 | Share et al. |
| 2010/0222493 A1 | 9/2010 | Kiefer-Liptak et al. |
| 2010/0260954 A1 | 10/2010 | Stenson et al. |
| 2010/0272886 A1 | 10/2010 | Vaes et al. |
| 2011/0237728 A1 | 9/2011 | Mestach et al. |
| 2011/0244156 A1 | 10/2011 | Lock et al. |
| 2011/0244157 A1 | 10/2011 | Singer et al. |
| 2011/0315591 A1* | 12/2011 | Lespinasse .......... C09D 167/00 206/524.3 |
| 2012/0027974 A1 | 2/2012 | Skillman et al. |
| 2012/0058354 A1 | 3/2012 | Hayes et al. |
| 2012/0138502 A1 | 6/2012 | Ambrose et al. |
| 2012/0145721 A1 | 6/2012 | Cavallin et al. |
| 2012/0171470 A1 | 7/2012 | Cavallin et al. |
| 2012/0177855 A1 | 7/2012 | Cavallin et al. |
| 2012/0237705 A1 | 9/2012 | Niederst et al. |
| 2012/0282475 A1 | 11/2012 | Fuhry et al. |
| 2012/0301647 A1 | 11/2012 | Moussa et al. |
| 2012/0318699 A1 | 12/2012 | Parekh et al. |
| 2013/0026322 A1 | 1/2013 | Wheeler et al. |
| 2013/0189463 A1 | 7/2013 | Stenson et al. |
| 2013/0022413 A1 | 8/2013 | Prouvost et al. |
| 2013/0202825 A1 | 8/2013 | Ambrose et al. |
| 2013/0211001 A1 | 8/2013 | Skillman et al. |
| 2013/0280453 A1 | 10/2013 | Seneker et al. |
| 2014/0010925 A1 | 1/2014 | Knight et al. |

FOREIGN PATENT DOCUMENTS

| | | |
|---|---|---|
| CN | 101517020 A | 8/2009 |
| CN | 102264791 A | 11/2011 |
| WO | WO2011/009040 | 1/2011 |
| WO | 2013169459 A1 | 11/2013 |

OTHER PUBLICATIONS

Martin Reinecke and Helmut Ritter, "Branching and crosslinking of an unsaturated oligoester with furfurylamides and sorbic acid amides via Diels-Alder additions," Makromol. Chem. 194 pp. 2385-2393 (1993). (Year: 1993).*

International Search Report and Written Opinion (PCT/US2013/026322), dated Jun. 3, 2013.

* cited by examiner

METHODS AND MATERIALS FOR THE FUNCTIONALIZATION OF POLYMERS AND COATINGS INCLUDING FUNCTIONALIZED POLYMER

CROSS REFERENCE TO RELATED APPLICATION

This application is a continuation of U.S. application Ser. No. 13/968,981 (now U.S. Pat. No. 9,650,176), filed Aug. 16, 2013, which is a continuation-in-part of International Application No. PCT/US2013/026322 filed on Feb. 15, 2013, which claims the benefit of U.S. Provisional Application No. 61/600,430 filed on Feb. 17, 2012, each of which is incorporated herein by reference in its entirety.

TECHNICAL FIELD

The present disclosure relates generally to the field of polymers. More specifically, the present disclosure relates to the field of polymers for use in coating compositions, including, for example, packaging coatings for use on packaging cans and containers.

BACKGROUND

A wide variety of coatings have been used to coat the surfaces of food and beverage cans. The cans are often coated using "coil coating" operations, i.e., a planar sheet of a suitable metal substrate (e.g., steel or aluminum metal) is coated with a suitable composition and cured and then the coated substrate is formed into the can end or body. The coating should preferably be capable of high-speed application to the substrate and provide the necessary properties when cured to perform in this demanding end use. For example, the coating should preferably be safe for prolonged food contact; have excellent adhesion to the substrate; be capable of being drawn during the forming step; when used as a can end coating, provide clean edges when the can end is opened to access the packaged product; resist staining and other coating defects such as "popping," "blushing" and/or "blistering;" and resist degradation over long periods of time, even when exposed to harsh environments. Previous coatings have suffered from one or more deficiencies.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halogen-containing vinyl polymers can be problematic. There is also a desire by some to reduce or eliminate certain epoxy compounds commonly used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Polyester-based coatings suitable for food-contact that have exhibited both good fabrication properties and an absence of crazing have tended to be too soft and exhibit unsuitable corrosion resistance. Conversely, polyester-based coatings suitable for food contact that have exhibited good corrosion resistance have typically exhibited poor flexibility and unsuitable crazing when fabricated.

What is needed in the marketplace is an improved binder system for use in coatings such as, for example, packaging coatings. Such packages, compositions and methods for preparing the same are disclosed and claimed herein.

SUMMARY

In one aspect, the present disclosure provides a functionalized polymer having one or more functional groups preferably located at one or more "intermediate" locations of the polymer (e.g., locations other than the terminal end of a backbone of the polymer). The functionalized polymer preferably includes one or more side groups having one or more functional groups. The side group can be attached at any suitable location including, for example, directly to a backbone of the polymer or to another portion of the polymer (e.g., attached to a pendant group that is in turn attached to a backbone of the polymer). In preferred embodiments, the functional-group-containing side group is derived from an unsaturated compound having one or more functional groups. The functional-group-containing side group is preferably incorporated into the polymer and/or a precursor thereof via a reaction that does not require a free-radical polymerization initiator.

The backbone of the functionalized polymer typically includes one or more heteroatoms. In certain preferred embodiments, the backbone is a polyester backbone.

In some embodiments, the functionalized polymer is a water-dispersible polymer such as, for example, a water-dispersible polyester polymer. The water-dispersible polymer preferably includes one or more side groups having one or more functional groups in the form of a salt group such as, e.g., a neutralized acid or base group.

In another aspect, the present disclosure provides a polymer having one or more functional-group-containing structural units (e.g., side groups) that are the reaction product of a pericylic reaction (e.g., a pericyclic Ene reaction or a cycloaddition reaction such as a Diels-Alder reaction) or a non-pericyclic Ene reaction. The structural unit may be located at any suitable location, including, for example, in pendant locations or terminal backbone locations. In some embodiments, the functional-group-containing structural unit is a pericyclic reaction product, more preferably a Diels-Alder or Ene reaction product, of an unsaturated compound having one or more functional groups, more preferably one or more functional groups described herein (e.g., a salt or salt-forming group). In an embodiment, the unsaturated compound, the resulting functional-group-containing structural unit of the polymer, or more preferably both of the aforementioned, has an atomic weight of less than about 200 Daltons.

In yet another aspect, the present disclosure provides a method for producing a functionalized polymer. The method includes providing an unsaturated polymer or prepolymer having one or more double or triple bonds, more typically one or more carbon-carbon double or triple bonds. In some embodiments, an unsaturated polymer is provided that is a linear or substantially linear condensation and/or step-growth polymer preferably having a number average molecular weight of greater than 2,000, and more preferably greater than 4,000. An unsaturated compound having one or more desired functional groups is then reacted with the unsaturated polymer or prepolymer to attach one or more functional-group-containing side groups. The side group is preferably attached via a reaction involving one or more double or triple bonds of the polymer or prepolymer and one or more double or triple bonds of the unsaturated compound. In some embodiments, the side group is attached to a backbone, or other portion, of the polymer via one or more carbon-carbon bonds. In preferred embodiments, the one or more covalent attachments are formed between the unsaturated compound and the unsaturated polymer or prepolymer using a Diels-Alder reaction, an Ene reaction, or both Diels-Alder and Ene reactions.

In yet another aspect, the present disclosure provides a coating composition including a functionalized polymer of the present disclosure. The coating composition preferably includes at least a film-forming amount of the polymer. In some embodiments, the coating composition is a water-based coating composition that may be applied, for example, as an adherent coating for articles such as, e.g., packaging articles (e.g., light metal packaging articles such as food or beverage containers, cosmetic containers, drug containers, portions of any of these, etc.).

The present disclosure also provides packaging articles having a coating composition of the present disclosure disposed on a surface thereof, which is typically a metal surface. In one embodiment, the packaging article is a container such as a food or beverage container, or a portion thereof (e.g., a twist-off closure lid, beverage can end, food can end, etc.), wherein at least a portion of an interior surface of the container (e.g., a food or beverage product facing side of the container) is coated with a coating composition described herein that is suitable for prolonged contact with a food or beverage product or other packaged product.

In one embodiment, a method of preparing a container is provided that includes an interior, food-contact coating of the present disclosure. The method includes: providing a coating composition described herein and applying the coating composition to at least a portion of a surface of a substrate prior to or after forming the substrate into a container or a portion thereof having the coating composition disposed on an interior and/or exterior surface. Typically, the substrate is a metal substrate, although the coating composition may be used to coat other substrate materials if desired.

In another embodiment, a method of forming a food or beverage can end (e.g., a riveted can end such as a riveted beverage can end for a beer, soda, or juice can) is provided that includes: applying a water-based coating composition including a water-dispersible polyester polymer described herein on a metal substrate (e.g., aluminum or steel) in the form of a planar coil or sheet, hardening the coating composition, and forming the planar coil or sheet into a food or beverage can end.

The above summary of the present disclosure is not intended to describe each disclosed embodiment or every implementation. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the disclosure are set forth in the description below. Other features, objects, and advantages of the invention will be apparent from the description and from the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term cycloaliphatic group means an organic group that contains a ring that is not an aromatic group.

A group that may be the same or different is referred to as being "independently" something. Substitution is anticipated on the organic groups of the compounds of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that encompasses the moiety.

The term "double bond" refers to any type of double bond between any suitable atoms (e.g., C, O, N, etc.), but excludes aromatic double bonds.

The term "triple bond" is non-limiting and refers to any type of triple bond between any suitable atoms.

The terms "unsaturated" or "unsaturation" when used in the context of a material or group refers to a material or group that includes at least one non-aromatic double bond or triple bond, more typically a non-aromatic carbon-carbon double bond.

The term "substantially free" of a particular mobile compound means that the compositions of the present disclosure contain less than 100 parts per million (ppm) of the recited mobile compound. The term "essentially free" of a particular mobile compound means that the compositions of the present disclosure contain less than 10 ppm of the recited mobile compound. The term "essentially completely free" of a particular mobile compound means that the compositions of the present disclosure contain less than 1 ppm of the recited mobile compound. The term "completely free" of a particular mobile compound means that the compositions of the present disclosure contain less than 20 parts per billion (ppb) of the recited mobile compound.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of XYZ compound") then the compositions of the present disclosure contain less than the aforementioned amount of the compound whether the compound is mobile in the coating or bound to a constituent of the coating. If the aforementioned phrases are used without the term "mobile" (e.g., "substantially free of XYZ compound") then the compositions of the present disclosure contain less than the aforementioned amount of the compound whether the compound is mobile in the coating or bound to a constituent of the coating.

The term "crosslinker" refers to a molecule capable of forming a covalent linkage between polymers or between two different regions of the same polymer.

The term "water-dispersible" in the context of a water-dispersible polymer means that the polymer can be mixed into water (or an aqueous carrier) to form a stable mixture. For example, a mixture that separates into different layers after being stored for 12 hours at 21° C. under normal storage conditions is not a stable mixture. The term "water-dispersible" is intended to include the term "water-soluble." In other words, by definition, a water-soluble polymer is also considered to be a water-dispersible polymer.

The term "dispersion" in the context of a dispersible polymer refers to the mixture of a dispersible polymer and a carrier. The term "dispersion" is intended to include the term "solution."

Unless otherwise indicated, a reference to a "(meth) acrylate" compound (where "meth" is bracketed) is meant to include both acrylate and methacrylate compounds.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Thus, for example, the term "polyester polymer" includes copolyesters.

The term "comprises" and variations thereof do not have a limiting meaning where these terms appear in the description and claims.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the present disclosure provides materials and methods for functionalizing a polymer to include one or more functional groups. In preferred embodiments, the functionalization is performed on a preformed unsaturated polymer. The functionalization process typically consumes at least one double or triple bond of the unsaturated polymer. After functionalization, the molecular weight of the functionalized polymer may optionally be increased if desired. Alternatively, an unsaturated prepolymer (e.g., an oligomer or low-molecular-weight polymer) may be functionalized and upgraded to the desired final molecular weight after functionalization. The final functionalized polymer will typically be unsaturated, but it may be optionally modified (e.g., via hydrogenation) to yield a saturated polymer.

The added functionality may confer one or more benefits to the polymer such as, for example, providing sites for crosslinking, facilitating dispersal of the polymer into an aqueous medium, improving the compatibility of the polymer with one or more other materials, improving adhesion of the cured coating to substrate, and so on. The one or more added functional groups may be present at any suitable location, including for, example, at terminal backbone locations, at pendant groups locations (e.g., present in a side group attached directly to the polymer backbone or in a side group that is separated from the polymer backbone by one or more branch points), and combinations thereof.

In preferred embodiments, the functionalized polymer includes a backbone having one or more heteroatoms. Preferred such backbones include condensation backbones and/or step-growth backbones. Such backbones may include any combination of condensation and/or step growth linkages, including, for example, amide, carbonate ester, ester, ether, imide, urea, urethane, or combinations thereof. In certain preferred embodiments, the polymer has a polyester backbone that may optionally include any other suitable linkages. Thus, for example, in some embodiments, the polyester polymer may be a polyester-urethane polymer.

The functionalized polymer preferably includes at least one functional group present in a side group that is attached to the backbone or another portion of the polymer (e.g., another portion attached to the backbone). In some embodiments, the side group constitutes an entire pendant group attached directly to the backbone, whereas in other embodiments the side group constitutes a portion of a pendant group and the side group itself is not directly attached to the backbone. In preferred embodiments, the functional-group-containing side group is attached to another portion of the polymer via one or more carbon-carbon bonds, more typically one or more carbon-carbon single bonds.

In some embodiments, a side group is located at one or both ends of the backbone. For example, one or both terminal ends of a preformed polymer may be modified to include a carbon-carbon double bond which is subsequently reacted with the unsaturated compound via a reaction disclosed herein to incorporate a functional-group-containing side group at one or both terminal ends of the backbone.

In preferred embodiments, the one or more functional-group-containing side groups are derived from an unsaturated compound, which typically includes one or more carbon-carbon double or triple bonds, more typically one or more carbon-carbon double bonds. A pericyclic reaction is preferably used to incorporate the unsaturated compound into the polymer or a precursor thereof. Suitable pericyclic reactions include Ene reactions and cycloaddition reactions. A Diels-Alder reaction is a preferred cycloaddition reaction. The resulting side group is typically unsaturated, although the side group may optionally be saturated.

While it is contemplated that polymers of the present disclosure may include side groups that are free-radical-polymerized vinyl and/or acrylic groups, presently preferred side groups derived from the unsaturated compound are not free-radical-polymerized. Thus, preferred functional-group-containing side groups are incorporated into the polymer in a reaction that does not involve a free-radical initiator. Examples of free-radical-polymerized groups include vinyl groups (also sometimes referred to as "acrylic" groups when (meth)acrylates and/or (meth)acrylic acids are used) formed via free-radical-initiated reaction of ethylenically unsaturated monomers such as alkyl acrylates (e.g., ethyl acrylate, propyl acrylate, butyl acrylate, hydroxyl propyl acrylate, hydroxy butyl acrylate, glycidyl acrylate, etc.), alkyl methacrylates (e.g., ethyl methacrylate, methyl methacrylate, propyl methacrylate, butyl methacrylate, hydroxypropyl methacrylate, hydroxybutyl methacrylate, glycidyl methacrylate, etc.), acrylic acid, methacrylic acid, vinyl aromatics (e.g., styrene, vinyl toluene, etc.), vinyl chloride, acrylamides, methacrylamides, acrylonitriles, vinyl acetate, and the like, and combinations thereof. Examples of free-radical initiators include thermal free-radical initiators, photochemical free-radical initiators, and the like. Examples of thermal free-radical initiators include peroxide initiators, redox initiator systems, persulfate initiators, azoalkane initiators, and the like.

For example, acid-functional acrylic groups are sometimes incorporated into polymers such as polyester polymers to render the polymer dispersible in water (see, e.g., U.S. Pub. No 2005/0196629 for a discussion of such water-dispersible polyester-acrylic graft copolymers). The acid-functional acrylic groups are typically incorporated into the polymer via reaction with a carbon-carbon double bond of the polymer via a free-radical polymerization reaction involving initiator.

While certain Ene reactions may involve free-radical reactions, it should be noted that such reactions do not involve free-radical initiators such as are employed for free-radical-polymerized vinyl groups.

In some embodiments, the side group includes a functional group located at a terminal end of the side group away from the portion of the side group attached to the backbone or other portion of the polymer. A functional group of the side group may be attached to the backbone or other portion of the polymer via a branched or un-branched, saturated or unsaturated carbon chain that does not include any heteroatoms in the chain. An example of such a carbon chain is the structure —$(C(R^1)_m)_n$—, wherein: each $R^1$ is independently any suitable atom or group (e.g., a hydrogen atom, a halogen atom, an organic group, etc.); each m is independently 0, 1, or 2; n denotes an integer preferably from 1 to 20, more preferably from 1 to 10; and one or more $R^1$ may optionally join together with one or more other $R^1$ and/or with another portion or portions of the polymer.

In some embodiments, the side group does not include any repeat units. In preferred such embodiments, the side group is attached directly to the backbone, or a pendant group that is attached to the backbone, and is derived from a single molecule of the unsaturated compound (e.g., a single molecule of sorbic acid or the like). This approach can result in a functional-group-containing side group (e.g., when sorbic acid or the like is used as the unsaturated compound) that does not crosslink with double or triple bonds present in other polymer strands or free monomer. This is distinct, e.g., from the acrylate groups of polyester-acrylate copolymers.

The functionalized polymer may have utility in a variety of end uses, including as an ingredient of a coating composition. The functionalized polymer is particularly useful as a binder polymer of an adherent coating composition. Coating compositions of the present disclosure may optionally include one or more of additional ingredients such as, for example, a liquid carrier, a crosslinker, a pigment, a lubricant, a catalyst, etc. The coating composition may be a powder coating composition or extrusion coating composition in certain embodiments. Typically, however, the coating composition is applied to a substrate with the assistance of a liquid carrier.

A benefit of the method of the present disclosure is that it allows for the addition of one or more functional groups to a polymer at one or more "intermediate" locations (e.g., locations other than terminal backbone locations such as pendant locations) after the polymer has been formed or substantially formed, which can eliminate the need to use certain tri-functional or higher reactants to provide such functional groups. The use of certain tri-functional or higher reactants, such as, for example, reactants having three of more of the same type of active hydrogen group (e.g., triols or tricarboxylic acids), can lead to unsuitably high levels of branching, and even gelling, before the desired molecular weight and/or degree of functionalization is achieved. While it may be possible to use such tri-functional or higher reactants in relatively low concentrations while avoiding gellation of the sample, it may not be possible to achieve the desired molecular weight and degree of functionalization at such concentrations. Thus, in some embodiments, the method of the present disclosure enables the production of a substantially linear polymer having a molecular weight and a degree of functionalization that is not typically achievable using conventional condensation polymerization techniques—particularly when the desired functional groups are reactive with other functional groups present in the polymerization mixture. Examples of substantially linear polymers include polymers in which substantially all (e.g., >95 wt-%, >98 wt-%, >99 wt-%, >99.5 wt-%, etc.) of the monomers used to form the polymer are di-functional or mono-functional monomers. Accordingly, substantially linear polymers typically include less than 5 weight percent ("wt-%"), less than 2 wt-%, less than 1 wt-%, or less than 0.5 wt-% of tri-functional or higher monomers.

For example, in some embodiments, the method of the present disclosure can be used to produce a substantially linear functionalized condensation and/or step-growth polymer such as, for example, a substantially linear functionalized polyester polymer having functional group(s) (e.g., active hydrogen groups) at one or more intermediate location and a molecular weight greater than 4,000 number average molecular weight ("Mn"). In some such embodiments (e.g., in which a melt polymerization process is used), the method can be used to produce such a higher molecular weight polymer (e.g., a polyester polymer) having, for example, a Mn of at least about 10,000 and more preferably from about 10,000 to about 30,000.

In preferred embodiments, the method of the present disclosure includes providing an unsaturated precursor polymer or prepolymer having one or more double or triple bonds. Although branched materials may be used, the unsaturated polymer or prepolymer is typically linear or substantially linear. (For purposes of convenience, the unsaturated polymer or prepolymer thereof having one or more double or triple bonds will be referred to collectively hereinafter as the "unsaturated precursor polymer," or when used in the context of a polyester polymer, as the "unsaturated polyester precursor polymer.") While the one or more double or triple bonds of the unsaturated precursor polymer are typically located in a backbone of the polymer, the double or triple bonds may also be located in one or more pendant groups.

The unsaturated precursor polymer is preferably reacted with an unsaturated compound having the desired functionality. Typically, the reaction results in a thermal adduct of the unsaturated compound of the unsaturated precursor polymer, but it is also contemplated that other suitable reaction mechanisms may be used. In preferred embodiments, the reaction is performed at an elevated temperature such as, for example, from about 140° C. to about 220° C., more preferably from about 160° C. to about 200° C., and even more preferably from about 170° C. to about 190° C.

Preferably, the unsaturated compound includes both: (i) one or more double bonds, more typically one or more carbon-carbon double bonds and (ii) one or more desired functional groups (which are typically groups other than double or triple bonds). Examples of suitable such functional groups may include active hydrogen groups having a hydrogen attached to, e.g., an oxygen (O), sulfur (S), and/or nitrogen (N) atom as, for example, in amine groups (e.g., =NH or —NH$_2$), aldehyde groups, anhydride groups, carboxylic groups (—COOH), hydroxyl groups (—OH), thiol groups (—SH); isocyanate (—NCO) or blocked isocyanate groups; ketone groups; any of the other functional groups described herein; or variants thereof (e.g., neutralized groups). In some embodiments, the functional group may be carbon-carbon double bonds.

Examples of suitable unsaturated compounds may include crotonic acid, furfuryl alcohol, furaldehyde, hydroxypropyl sorbate, sorbic acid, vinyl acetic acid and mixtures or derivates thereof. Additional examples of suitable unsaturated compounds may include: 2,4-hexadienoic acid (E)-1-trimethylsilyloxy-1,3-butadiene, (E)-2,4-pentadienoic acid, (E)-1-amino-1,3-butadiene, (E)-1-amido-1,3-butadiene, 2-trimethylsilyloxy-1,3-butadiene, (E)-1-methoxy-3-trimethylsilyloxy-1,3-butadiene, vinylnaphthalene, vinyldihydronaphthalene, vinylphenanthrene, vinylindole, vinylbenzofuran, vinylbenzothiophene, cyclohexa-2,4-dienone, o-benzoquinone, and mixtures thereof.

In some embodiments, salt or salt-forming groups are preferred functional groups for inclusion in the unsaturated compound. Acid or anhydride groups are particularly preferred in some embodiments.

In some embodiments, the unsaturated compound includes at least one allylic hydrogen, more preferably two allylic hydrogens attached to a same carbon atom. In an embodiment, the unsaturated compound has the structure (H)(W$^1$)C—C(W$^2$)=C(W$^3$)(W$^4$), wherein each of W$^1$ to W$^4$ is independently any suitable atom or group, with the proviso that at least one of W$^1$ to W$^4$ includes a functional group, more preferably a functional group disclosed herein. In preferred embodiments, W$^1$ is a hydrogen atom and at least one of W$^2$, W$^3$, or W$^4$ includes a functional group, more preferably a salt or salt-forming group.

The reaction between the unsaturated compound and the unsaturated precursor polymer typically consumes one or more double bonds and results in the formation of one or more covalent attachments between the unsaturated compound and the unsaturated precursor polymer. In some embodiments, the one or more covalent attachments are each carbon-carbon single bonds.

In certain preferred embodiments, the unsaturated compound includes two or more conjugated carbon-carbon double bonds. By way of example, a compound having a —C(R)=C(R)—C(R)=C(R)— segment is a conjugated diene, where each R independently denotes any suitable atom (e.g., hydrogen, a halogen, etc.) or group. Examples of conjugated unsaturated compounds may include furfuryl alcohol, furaldehyde, hydroxypropyl sorbate, sorbic acid, and the like. Sorbic acid is a preferred conjugated unsaturated compound. By way of example, other suitable functionalized conjugated unsaturated compounds may include functionalized variants of any of the following: anthracene, butadiene (including, e.g., dimethyl butadiene), cyclohexadiene, cyclopentadiene (including, e.g., 1-alkyl cyclopentadienes or 2-alkyl cyclopentadienes), furan, isoprene, methyl vinyl ketone, thiophene, and mixtures thereof.

In preferred embodiments, the unsaturated compound is reacted with the unsaturated precursor polymer to form a covalently attached side group derived from the unsaturated compound and having one or more functional groups. While not intending to be bound by any theory, it is believed that the unsaturated compound is covalently attached to the unsaturated precursor polymer via a reaction involving one or more double or triple bonds of the polymer to incorporate one or more side groups having the desired function group(s). In particular, it is believed that in preferred embodiments the reaction proceeds via a Diels-Alder reaction mechanism and/or an Ene reaction mechanism. Depending upon the materials used and the reaction conditions, it is believed that both Diels-Alder and Ene reactions can occur, which results in the incorporation of side groups having different structures. Diels-Alder and Ene reactions are both members of the "pericyclic" family of chemical reactions, although certain Ene reactions may be non-pericyclic reactions (e.g., certain Ene reactions in which a Lewis acid catalyst is used). It is also possible that one or more other pericyclic reactions may occur.

Diels-Alder reactions (often referred to as [4+2] cycloadditions) typically involve the addition of an unsaturated component (often referred to as a "dienophile" in the context of a Diels-Alder reaction) across the 1,4 position of a conjugated diene component to form a cycloaddition reaction product that is typically cyclic or bicyclic in nature. In some situations, at least one of the conjugated diene and unsaturated components contains one or more substituents that "activate" the component toward reaction, although in some instances one or both components can contain a "deactivating" substituent or substituents. The Diels-Alder reaction is generally considered to be a concerted reaction, and as such, either component can be the "electron donor" or "electron acceptor" depending upon the substituents bonded thereto. By way of example, a schematic diagram of the reaction mechanism thought to occur during a Diels-Alder reaction between sorbic acid and an unsaturated structural unit derived from maleic anhydride is depicted below, including the resulting functionalized side group.

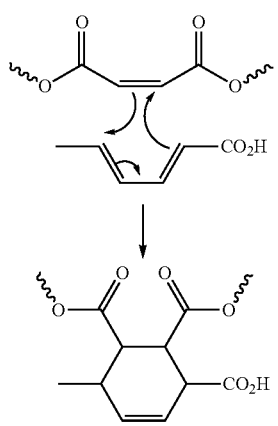

Thus, in some embodiments, the side group is attached to another portion of the functionalized polymer (e.g., a backbone of the polymer or another group attached to the backbone) via a cyclic group, which may optionally be a polycyclic group (e.g., a bridged bicyclic group such as a norbornene group). When a side group is attached via a Diels-Alder reaction mechanism, an unsaturated cyclic group is believed to result at the site of covalent attachment. The resulting unsaturated cyclic group may optionally be hydrogenated, if desired, to yield a saturated cyclic group In contrast, the reaction mechanism thought to occur if an Ene reaction occurs between sorbic acid and an unsaturated structural unit derived from maleic anhydride is depicted below, including the resulting functionalized side group.

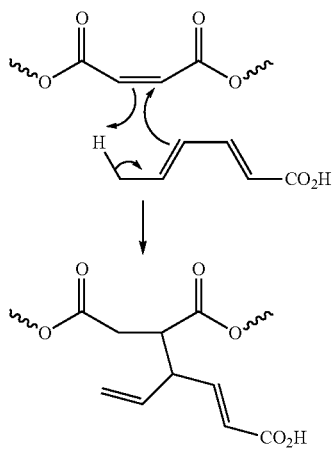

Unlike a Diels-Alder reaction mechanism, an Ene reaction mechanism does not require an unsaturated conjugated diene component. As such, when an Ene reaction mechanism is employed, a mono-unsaturated compound may be used (e.g., vinyl acetic acid) to incorporate a side group of the present disclosure. Ene reactions typically require that at least one allylic hydrogen is present, more preferable two allylic hydrogens attached to a same carbon atom. As depicted in the above reaction diagram, the covalently attached side group resulting from the Ene reaction is thought to include a double bond that includes a carbon atom to which an allylic hydrogen was attached prior to reaction.

In some embodiments, a Diels-Alder or Ene reaction mechanism may be used to covalently attach an unsaturated compound to an unsaturated pendant group of the unsaturated precursor polymer. In such embodiments, the resulting polymer includes at least one functional-group-containing side group that is not attached directly to a backbone of the polymer.

A Diels-Alder or Ene reaction may also be used to "endcap" one or more terminal ends of a backbone of the unsaturated precursor polymer with a structural unit derived from the unsaturated compound in order to provide one or more functional groups.

While any suitable double or triple bonds may be included in the unsaturated precursor polymer, carbon-carbon double bonds and carbon-carbon triple bonds are preferred, with carbon-carbon double bonds being presently preferred. If desired, the double bonds may be conjugated double bonds, more preferably conjugated carbon-carbon double bonds. The unsaturated precursor polymer can have any suitable backbone, including any type of backbone previously described herein. In certain preferred embodiments, the unsaturated precursor polymer has a polyester backbone, which may optionally include any other suitable linkages as previously discussed.

As discussed above, carbon-carbon double bonds are preferred for both the unsaturated compound and the unsaturated precursor polymer. Examples of other suitable double bonds may include carbon-oxygen double bonds, carbon-nitrogen double bonds, nitrogen-nitrogen double bonds, or nitrogen-oxygen double bonds. Preferred double bonds are capable of participating in one or both of a Diels-Alder reaction and an Ene reaction.

In another aspect, the present disclosure provides a water-dispersible polymer having one or more water-dispersing groups, at least one of which has preferably been incorporated into the polymer using the functionalization method of the present disclosure. The water-dispersible polymer preferably has utility as a binder polymer for use in water-based coating compositions, including, e.g., water-based packaging coating compositions, and is preferably included in such compositions in at least a film-forming amount.

In general, it is difficult to take a binder polymer having utility in solvent-based coating compositions and successfully disperse it into an aqueous medium to produce a water-based coating composition that exhibits suitable coating properties when cured. This is especially true in the area of packaging coatings (e.g., food or beverage can coatings), where coating compositions must exhibit a stringent balance of difficult to achieve coating properties. Conventional water-dispersing techniques, when applied, for example, to polyester polymers having utility in solvent-based packaging coating compositions, often yield water-based packaging coatings having inferior coating properties. However, it has been surprisingly discovered that the materials and methods of the present disclosure can be used to modify a polyester binder polymer having utility in solvent-based packaging coating compositions to produce a water-dispersible variant thereof that can be formulated into a water-based packaging coating composition that exhibits coating properties, when cured, that are comparable to that of the cured solvent-based coating composition.

The water-dispersible polymer can include any suitable water-dispersing groups. In preferred embodiments, the water-dispersible polymer includes water-dispersing groups in the form of one or more salt groups such as, for example, anionic or cationic salt groups (e.g., neutralized acid or base groups), or a combination thereof.

Examples of suitable salt groups include anionic groups, cationic groups, and combinations thereof. Examples of anionic salt groups include neutralized acid or anhydride groups, sulphate groups (—OSO$_3^-$), phosphate groups (—OPO$_3^-$), sulfonate groups (—SO$_2$O$^-$), phosphinate groups (—POO$^-$), phosphonate groups (—PO$_3^-$), and combinations thereof. Examples of suitable cationic salt groups include:

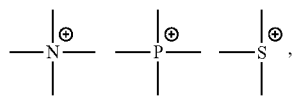

(referred to, respectively, as quaternary ammonium groups, quaternary phosphonium groups, and tertiary sulfate groups) and combinations thereof. Presently preferred salt groups include neutralized acid or anhydride groups and neutralized base groups, with neutralized carboxylic groups being preferred in certain embodiments.

Non-limiting examples of neutralizing agents for forming anionic salt groups include inorganic and organic bases such as an amines, sodium hydroxide, potassium hydroxide, lithium hydroxide, ammonia, and mixtures thereof. In certain embodiments, tertiary amines are preferred neutralizing agents. Non-limiting examples of suitable tertiary amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof.

Examples of suitable neutralizing agents for forming cationic salt groups include organic and inorganic acids such as formic acid, acetic acid, hydrochloric acid, sulfuric acid, and combinations thereof.

In preferred embodiments, some or all of the salt groups of the water-dispersible polymer are provided using the functionalization method of the present disclosure and an unsaturated compound having: (i) one or more double bonds, more preferably one or more carbon-carbon double bonds and (ii) one or more salt or salt-forming groups.

The incorporation of one or more water-dispersing groups into the polymer via reaction with the unsaturated compound can occur at any suitable time during the polymer synthesis. For example, a preformed unsaturated polymer of the desired molecular weight may be post-reacted with the unsaturated compound to provide the desired number of water-dispersing groups.

In other embodiments, an unsaturated prepolymer may be reacted with the unsaturated compound and the resulting functionalized prepolymer can be further upgraded to produce a functionalized polymer having the desired final molecular weight. In certain such situations, however, care should be exercised to avoid gelling. For example if the unsaturated compound is an acid-functional compound such as, for example, sorbic acid, and the prepolymer has acid and/or hydroxyl groups on each end, then the resulting prepolymer will have three or more acid and/or hydroxyl groups, which may lead to gelling problems if the prepolymer is reacted with additional polyfunctional compounds (e.g., diacids and/or diols) to further upgrade the molecular weight. Such potential gelling issues are absent when a preformed unsaturated polymer of the desired molecular weight is reacted with the unsaturated compound.

Any suitable unsaturated compound having a suitable salt or salt-forming group may be employed to form the water-dispersible polymer. The unsaturated compound may include any suitable such groups described herein. Neutralizable acid or base groups are preferred salt-forming groups.

The unsaturated compound having one or more salt or salt-forming groups preferably includes at least one double bond capable of participating in a Diels-Alder reaction or an Ene reaction, with carbon-carbon double bonds being preferred. Conjugated double bonds are preferred in certain embodiments (e.g., where a Diels-Alder reaction is desired), with conjugated carbon-carbon double bonds being particularly preferred.

In embodiments in which an unsaturated compound having conjugated double bonds is used, the unsaturated polymer may include any suitable proportion of Ene incorporated or Diels-Alder incorporated side groups of the present disclosure. In some embodiments, both Ene and Diels-Alder reaction product side groups are present, with a substantial portion of the overall functional-group-containing side groups of the present disclosure incorporated via an Ene reaction (e.g., >10%, >25%, >50%, >60%, >70%, etc.). When both types of side groups are present, the Diels-Alder and Ene reaction product side groups can be present on same polymer strands, on different polymer strands, or a combination thereof.

While the salt-group-containing or salt-forming-group-containing unsaturated compound can be of any suitable atomic weight, in presently preferred embodiments, it has an atomic weight of less than about 200 (e.g., less than 200, less than 175, less than 150, less than 125, less than 100, etc.). While long-chain (e.g., >C12) and very-long chain (e.g., >C22) unsaturated fatty acids may be used, such unsaturated compounds are not presently preferred, especially if the polymer is to be used in certain food-contact packaging coating applications.

Examples of suitable unsaturated compounds having salt or salt-forming groups include sorbic acid (also referred to as 2,4-hexadienoic acid), 2,4-pentadienoic acid, furoic acid, 1-amino-1,3-butadiene, 1-naphthaleneacetic acid, anthracene carboxylic acid, 1,8-naphthalic anhydride, 1-naphthalene methylamine, vinyl acetic acid, neutralized variants thereof, and combinations thereof. Sorbic acid is a preferred unsaturated compound for use in forming the water-dispersible polymer.

The water-dispersible polymer can include any desired number of side group(s) derived from the unsaturated compound having one or more salt or salt-forming groups. In some embodiments, the water-dispersible polymer includes at least about 0.5% by weight, more preferably at least 1% by weight, and even more preferably at least about 2% by weight of such side groups. Although the maximum amount of such side groups is not restricted, the water-dispersible polymer will typically include side groups in an amount of less than about 50% by weight, more typically less than about 30% by weight, even more typically less than about 7% by weight. The above side group concentrations are based on the amount of unsaturated compound included in the reaction mixture relative to the total nonvolatile weight of reactants used to make the water-dispersible polymer.

The discussion that follows provides representative materials and methods for making water-dispersible polyester polymers of the present disclosure, as well as coating compositions formulated therefrom. The teachings of the below discussion may be applicable to other embodiments of the present disclosure as well.

The water-dispersible polyester polymer may include polymer segments other than polyester segments. Typically, however, at least 50 wt-% of the polyester will comprise polyester segments. In some embodiments, substantially all (e.g., >80 wt-%, >90 wt-%, >95 wt-%, etc.), or all, of the polyester on a weight basis comprises polyester segments.

The unsaturated polyester precursor polymer may be prepared using standard condensation reactions. The polyester precursor is typically derived from a mixture of at least one polyfunctional alcohol ("polyol") esterified with at least one polycarboxylic acid (or derivative thereof). The reaction mixture preferably includes at least one unsaturated reactant. In some embodiments, a transesterification polymerization may be used. If desired, the unsaturated polyester precursor polymer may include polymer linkages (e.g., amide, carbamate, carbonate ester, ether, urea, urethane, etc.), side chains, and end groups not related to simple polyol and polyacid components.

Any suitable reaction process may be used to make the polymers of the present disclosure. Suitable such processes include, for example, processes in which polymerization occurs in the presence of a solvent such as reflux polymerization processes as well as processes in which polymerization occurs in the absence of added solvent such as melt-blend polymerization processes.

In some embodiments, it may be advantageous to use a polymerization process in which solvent is not required. Benefits associated with such processes may include the ability to process at reaction temperatures in excess (e.g., >230° C.) of the reflux temperature of common solvents, enhanced reaction kinetics, the avoidance of solubility issues that may be associated with the use of certain solvents, and the ability to produce higher molecular weight polymers. In some embodiments, a substantially solvent-free polymerization process may be employed in which the reactants are preferably reacted at a high temperature (e.g., >250° C.) under a reduced pressure. In such solvent-free polymerizations processes, the reaction mixture is typically agitated during polymerization using a high-torque mixing unit that is preferably capable of handling the viscosities typically associated with very high molecular weight polymers in the absence of added solvents or diluent. The finished polymer is typically ejected from the reactor as a solid "strand", which can be chopped into pellets of a desired size, which can subsequently be dissolved in a suitable liquid if desired. Such solvent-less polymerization processes can be used, for example, to produce polyester polymers having a Mn of greater than about 10,000, such as from about 10,000 to about 30,000.

Any suitable unsaturated reactants may be used to incorporate double and/or triple bonds into the unsaturated polyester precursor polymer. Such unsaturated reactants will typically include at least one reactive functional group capable of participating in a condensation and/or step-growth polymerization, and more typically will include two or more such reactive functional groups, with two such functional groups being preferred in some embodiments. Examples of such reactive functional groups include any of the active hydrogen groups disclosed herein, as well as any other suitable reactive functional groups such as, for example, isocyanate (—NCO) groups. Reactive functional groups capable of participating in ester-forming reactions (e.g., hydroxyl groups, carboxylic groups, anhydride groups, etc.) are examples of preferred such reactive functional groups. Unsaturated polyacids, (poly)anhydrides, or esterified variants thereof are examples of preferred unsaturated reactants, with unsaturated dicarboxylic acids and unsaturated mono-anhydrides being presently preferred. Some specific examples of suitable unsaturated reactants may include unsaturated carboxylic acids such as maleic acid, 2-methyl maleic acid, fumaric acid, itaconic acid, 2-methyl itaconic acid, nadic acid, methyl-nadic acid, tetrahydrophthalic acid, methyltetrahydrophthalic acid, derivatives or anhydrides thereof (e.g., maleic anhydride, nadic anhydride, and the like), and mixtures thereof. Some specific examples of suitable unsaturated polyols may include butane diol, butyne diol, 3-hexyne-2,5-diol, 2-butynedioic acid, and mixtures thereof.

Maleic anhydride is an example of a preferred compound for incorporating unsaturation into the unsaturated polyester precursor polymer. Maleic anhydride is particularly useful for a variety of reasons, including, for example, cost and ready availability in commercial quantities. Moreover, while not intending to be bound by any theory, it is believed that maleic anhydride is a particularly strong dienophile having excellent reactivity in a Diels-Alder reaction. Maleic anhydride is also a preferred reactant for Ene reactions. It has been observed that Diels-Alder reactions can be conducted at a lower temperature for unsaturated polyester polymers having units derived from maleic anhydride (e.g., from about 150 to about 200° C. as opposed to, e.g., from 260 to 280° C. as may be required for polymers having units derived from unsaturated fatty acids or oils), which may be beneficial in certain embodiments in which a lower reaction temperature is desired.

In some embodiments (e.g., where the coating composition is intended for use as a food-contact coating composition), it is preferable that the ratio of unsaturated compound to unsaturation in the polyester precursor polymer be controlled to avoid the presence of unsuitable amounts of residual unreacted unsaturated compound in the coating composition. For example, when the unsaturation of the polyester precursor is provided by maleic anhydride (or some other such unsaturated reactant(s)), the polyester precursor polymer preferably includes an excess, on a molar basis, of units derived from maleic anhydride (or other unsaturated reactants) relative to the amount of functional-group-containing unsaturated compound (e.g., sorbic acid) included in the reaction mixture. More preferably, the molar ratio of functional-group-containing unsaturated compound to unsaturated monomeric units present in the polyester precursor is less than 0.8:1, and even more preferably less than 0.6:1. In some embodiments, the molar ratio of functional-group-containing unsaturated compound to unsaturated monomeric units present in the polyester precursor is greater than about 0.1:1, more preferably greater than about 0.2:1, and even more preferably greater than 0.3:1. In some embodiments, the molar ratio of functional-group-containing unsaturated compound to carbon-carbon double bond containing monomeric units present in the polyester precursor is as described above.

Examples of suitable polycarboxylic acids for preparing the water-dispersible polyester polymer include dicarboxylic acids and polycarboxylic acids having higher acid functionality (e.g., tricarboxylic acids, tetracarboxylic acids, etc.) or anhydrides thereof, precursors or derivatives thereof (e.g., an esterifiable derivative of a polycarboxylic acid, such as a dimethyl ester or anhydride), or mixtures thereof. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, isophthalic acid, trimellitic acid, terephthalic acid, naphthalene dicarboxylic acid, cyclohexane dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. It should be understood that in synthesizing the polyester, the specified acids may be in the form of anhydrides, esters (e.g., alkyl ester) or like equivalent form. For sake of brevity, such compounds are referred to herein as "carboxylic acids" or "polycarboxylic acids."

Examples of suitable polyols include diols, polyols having three or more hydroxyl groups (e.g., triols, tetraols, etc.), and combinations thereof. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. If desired, adducts of polyol compounds (e.g., triols, tetraols, etc.) and monofunctional compounds may be used.

The reaction mixture used to form the water-dispersible polyester polymer may include any suitable optional comonomers.

If trifunctional or higher polyols or polycarboxylic acids are included in the reaction mixture used to make the unsaturated polyester precursor polymer, the total amount of such reactants are preferably stoichiometrically controlled to avoid gelling. In certain preferred embodiments, trifunctional or higher polyols and polycarboxylic acids are not included in the reaction mixture used to make the unsaturated polyester precursor polymer. If used, trifunctional monomer is preferably used in an amount of less than 5% by weight, based on the total nonvolatile weight of the reactants used to make the unsaturated polyester precursor polymer.

In some embodiments, it is preferable that the water-dispersible polyester polymer includes one or more aromatic groups, more preferably one or more backbone aromatic groups. Preferred aromatic polymers include at least about 5 wt-%, more preferably at least about 10 wt-%, even more preferably at least about 15 wt-%, and even more preferably at least about 20 wt-% of aromatic groups. In some embodiments, the polymer may include up to 75 wt-% or more of aromatic groups. The aforementioned weight percentages correspond to the total weight of aromatic monomers used to form the polymer relative to the total weight of the reactants used to form polymer. Thus, for example, if an oligomer having an aromatic group is incorporated into the polymer, the wt-% of the aromatic group in the polymer is calculated using the weight of the aromatic monomer used to form the oligomer (as opposed to the weight of the oligomer). Suitable aromatic monomers include, for example, acid-, ester-, or anhydride-functional aromatic monomers (e.g., aromatic monoacids and/or polyacids, more preferably aromatic polyacids); hydroxyl-functional aromatic monomers (e.g., aromatic mono- and/or polyfunctional monomers); or aromatic monomers having one or more (typically at least two) reactive groups capable of participating in a condensation and/or step-growth reaction with a complimentary reactive group (more preferably, a hydroxyl, carboxylic acid, ester, or anhydride groups) to form a covalent linkage. Examples of suitable aromatic monomers include terephthalic acid, isophthalic acid, phthalic acid, phthalic anhydride, trimellitic anhydride, trimellitic acid, dimethyl terephthalate, dimethyl isophthalate, dimethyl phthalate, 5-sodiosulpho isophthalic acid, naphthalic acid, 1,8-naphthalic anhydride, dimethyl naphthalate, pyromellitic dianhydride, and derivatives and combinations thereof.

The water-dispersible polyester polymer may have any suitable end groups. In some embodiments, the backbone of the water-dispersible polyester polymer is hydroxyl-terminated and/or carboxyl-terminated, more preferably hydroxyl-terminated.

When acid or anhydride groups are used to impart water-dispersibility to the polyester polymer, the acid- or anhydride-functional polymer preferably has an acid number of at least 5, and more preferably at least 40 milligrams (mg) KOH per gram resin. The acid- or anhydride-functional polyester polymer preferably has an acid number of no greater than 400, and more preferably no greater than 100 mg KOH per gram resin.

In certain preferred embodiments, the water-dispersible polyester polymer is capable of being mixed with water to form a stable aqueous dispersion that does not separate into layers after being stored under normal conditions (e.g., storage in ambient temperature without agitation) for 1 week, preferably 1 month, and more preferably 3 months.

The water-dispersible polyester polymer may have any suitable glass transition temperature ("Tg"). In some embodiments, the polymer has a Tg of at least about 0° C., more preferably at least about 10° C., and even more preferably at least about 25° C. Although the maximum Tg is not particularly restricted, preferably the Tg is less than about 150° C., more preferably less than about 100° C., and even more preferably less than about 50° C.

The water-dispersible polyester polymer may be of any suitable molecular weight. In preferred embodiments, the water-dispersible polyester polymer has a number average molecular weight (Mn) of at least about 2,000, more preferably at least about 4,000, and even more preferably at least 5,000. While the upper molecular weight range is not restricted, the water-dispersible polyester polymer will typically have a Mn of less than about 50,000 and more typically less than 30,000. The molecular weight may vary depending on a variety of factors, including, for example, the desired coating end use, cost, and the manufacturing method employed to synthesize the polymer. In embodiments in which a processing solvent is present during polymer manufacture, the polymer will typically have a Mn of less than about 20,000, even more typically less than about 10,000. In embodiments in which a melt-polymerization manufacturing process is used, the polymer may have a Mn of greater than about 10,000 or from about 10,000 to about 30,000.

In some embodiments, the water-dispersible polyester polymer is preferably free or appreciably free of fatty acids (e.g., long-chain or very long-chain fatty acids), oils, and/or other long-chain hydrocarbons. It is believed that the use of unsuitable amounts of such materials may impart undesirable off-tastes or odors to packaged food or beverage products that are kept in prolonged contact with the coating compositions of the present disclosure. When used in interior beer can coatings, the presence of unsuitable amounts of such materials in the polymer may diminish the "head" on the beer product. In addition, the presence of unsuitable amounts of such materials in the polymer may cause the corrosion resistance of coating compositions of the present disclosure to be unsuitable for certain end uses, especially for packaging coatings intended for use with so called "hard-to-hold" food or beverage products. In certain preferred embodiments, the water-dispersible polyester polymer includes no more than 10 wt-%, more preferably no more than 3 wt-%, and even more preferably no more than 1 wt-% of fatty acids, oils, or other "long-chain" hydrocarbons (e.g., having 8 or more carbon atoms such as >C10, >C12, >C15, >C20, >C30), based on the total non-volatile weight of the reactants used to make the water-dispersible polyester polymer.

It is contemplated that, in certain embodiments, the water-dispersible polyester polymer may include some long-chain hydrocarbons having 12 or less carbon atoms such as, for example, sebacic acid.

In certain preferred embodiments, the water-dispersible polyester polymer is not an alkyd resin.

Similarly, presently preferred coating compositions of the present disclosure are preferably free, or appreciably free, of fatty acids (e.g., long-chain or very long-chain fatty acids) and oils. Preferred coating compositions include no more than 20 wt-%, more preferably no more than 10 wt-%, and even more preferably no more than 5 wt-% of oils and fatty acids, based on the total nonvolatile weight of the coating composition.

In some embodiments, the water-dispersible polyester polymer has a backbone that includes one or more "soft" segments and one or more "hard" segments, and preferably at least two hard segments. In some such embodiments, the polyester polymer includes a plurality of hard segments and preferably has a Tg of from about 10° C. to about 50° C., more preferably from about 15° C. to about 35° C. The one or more hard segments preferably have a Tg from about 10° C. to about 100° C., more preferably from about 15° C. to about 80° C., even more preferably from about 20° C. to about 70° C. In one embodiment, the hard segment has a Tg of from 20° C. to 40° C. Typically, the one or more hard segments are formed from an oligomer or polymer having an Mn of at least 500, more preferably at least 750, and even more preferably at least 1,000.

The material or materials used to generate the one or more soft segments are preferably selected such that the one or more soft segments contribute to (i) a lower overall Tg for the polyester polymer (e.g., as compared to a polyester polymer of a similar molecular weight lacking the one or more soft segments) and/or (ii) enhanced fabrication properties (e.g., flexibility) for a coating composition formulated using the polyester polymer. Examples of materials for use in forming the soft segment (either neat or in combination with one or more comonomers) include adipic acid; azelaic acid; fatty acid-based materials such as fatty acid dimers or dimer fatty diols; sebacic acid; succinic acid; glutaric acid; a derivative or variant thereof; or a mixture thereof. In some embodiments, a soft segment is derived from one of the above monomers without the use of any additional comonomers. When the soft segment is a polyester oligomer or polymer, the aforementioned monomers may be used in combination with one or more suitable comonomers to generate the soft segment.

Representative materials and methods for producing a polyester polymer having hard and soft segments are described in International Publication No. WO/2012/051540. For purposes of the present disclosure, in order to produce water-dispersible variants of the solvent-based polyester polymers described in WO/2012/051540 using the method of the present disclosure, the reactants used to produce the polymer preferably includes one or more unsaturated reactants described herein (e.g., maleic anhydride) to allow for functionalization of the polymer with water-dispersing groups using the method of the present disclosure. It has been discovered that such water-dispersible polyester polymers exhibit superior properties when used as a binder polymer for certain water-based, food-contact packaging coating compositions, including, e.g., beverage can end coating compositions.

The hard and soft segments may be organized in any suitable configuration. In some embodiments, the backbone of the water-dispersible polyester polymer includes an alternating sequence of hard and soft segments. In such embodiments, the alternating hard and soft segments are typically connected to one another via step-growth linkages, more typically condensation linkages such as ester linkages. A representative example of such an alternating polymer is provided below in Formula I:

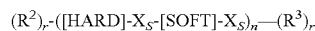

where:
[HARD] independently denotes a hard segment;
[SOFT] independently denotes a soft segment;
each X, if present, is independently a divalent organic group, and more preferably a step-growth linkage such as, e.g., a condensation linkage;
each s is independently 0 or 1, more preferably 1;
n is 1 or more, more preferably 1 to 15;
$R^2$, if present, is a reactive functional group (e.g., —OH, —COOH, etc.), an organic group, or a soft segment that may optionally include a terminal reactive functional group and may optionally be connected to the adjacent hard segment via a step-growth linkage;
$R^3$, if present, is a reactive functional group (e.g., —OH, —COOH, etc.), an organic group, or a hard segment that may optionally include a terminal reactive functional group; and
each r is independently 0 or 1.

In one embodiment, n is at least 2; each s is 1; each X is an ester linkage; each r is 1; $R^2$ is a reactive functional group, more preferably a hydroxyl group; and $R^3$ is a hard segment terminated with a reactive functional group, more preferably $R^3$ is a hydroxyl-terminated hard segment.

In some embodiments, the water-dispersible polyester polymer is terminated on each end with a hard segment, more preferably a hard segment having a terminal reactive functional group, and even more preferably a hydroxyl-terminated hard segment.

In some embodiments, the ratio, on a weight basis, of hard to soft segments in the water-dispersible polyester polymer is on average from 1:1 to 50:1, more preferably from 8:1 to 20:1, and even more preferably from 10:1 to 15:1 (hard segments:soft segments).

The water-dispersible polyester polymer may include any number of hard and soft segments. In preferred embodiments, the polyester polymer includes, on average, from 1 to 35, more preferably from 2 to 20, and even more preferably from 4 to 10 of each of the hard and soft segments. In preferred embodiments, the polyester polymer includes, on average, w soft segments (where "w" is the average number of soft segments) and w+1 hard segments (e.g., when w is 3, w+1 is 4).

In some embodiments, the hard and soft segments constitute at least a substantial majority of the polyester polymer on a weight basis. In some such embodiments, the hard and soft segments constitute at least 70 wt-%, at least 85 wt-%, or at least 90 wt-% of the polyester polymer of the present disclosure. The above weight percentages include any linkage groups (e.g., ester linkages) linking the hard and soft segments that are formed via reaction of complimentary reactive functionalities (e.g., hydroxyl and carboxylic groups) present on precursor hard and soft segment reactants.

The water-dispersible polyester polymer may have utility in a variety of different coating end uses. It has been discovered that the water-dispersible polyester polymer is particularly useful in packaging coating applications, including food or beverage container applications. The discussion that follows pertains to coating compositions formulated using the water-dispersible polyester polymer and having utility in packaging coating end uses. While the discussion that follows focuses on packaging coating compositions, it is within the scope of the present disclosure to apply the teachings to coating compositions intended for other end uses.

Coating compositions of the present disclosure may include any suitable amount of the water-dispersible polyester polymer to produce the desired result. Preferred coating compositions include at least about 50 wt-%, more preferably at least about 60 wt-%, and even more preferably at least about 70 wt-% of the water-dispersible polyester polymer. Preferred coating compositions include up to about 100 wt-%, more preferably up to about 95 wt-%, and even more preferably up to about 80 wt-% of the water-dispersible polymer. These weight percentages are based on the total weight of resin solids present in the coating composition. While the total amount of resins solids in the coating composition may vary greatly depending on the particular embodiment and may be any suitable amount, resin solids will typically constitute at least a majority of the total nonvolatile weight of the coating composition.

The coating composition preferably further comprises a crosslinking resin. For example, any of the well known hydroxyl-reactive curing resins can be used. The choice of particular crosslinker typically depends on the particular product being formulated. Examples of suitable crosslinkers include aminoplasts, phenoplasts, blocked isocyanates, and combinations thereof.

Phenoplast resins include the condensation products of aldehydes with phenols. Formaldehyde and acetaldehyde are preferred aldehydes. Various phenols can be employed such as, for example, phenol, cresol, p-phenylphenol, p-tert-butylphenol, p-tert-amylphenol, and cyclopentylphenol.

Aminoplast resins include, for example, the condensation products of aldehydes such as formaldehyde, acetaldehyde, crotonaldehyde, and benzaldehyde with amino- or amido-group-containing substances such as urea, melamine, and benzoguanamine. Examples of suitable aminoplast resins include benzoguanamine-formaldehyde resins, melamine-formaldehyde resins, esterified melamine-formaldehyde, urea-formaldehyde resins, and combinations thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethyl amino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Examples of suitable isocyanate crosslinkers include blocked or non-blocked aliphatic, cycloaliphatic or aromatic di-, tri-, or poly-valent isocyanates, such as hexamethylene diisocyanate (HMDI), cyclohexyl-1,4-diisocyanate and the like, and mixtures thereof. Examples of generally suitable isocyanates for use in such crosslinkers include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof.

The level of curing agent used will depend, for example, on the type of curing agent, the time and temperature of the bake, and the molecular weight of the polymer. When used, the crosslinker is typically present in an amount ranging from about 5 to about 40% by weight. Preferably, the crosslinker is present in an amount ranging from between 10 to 30% by weight; and more preferably, from 15 to 25% by weight. These weight percentages are based upon the total weight of the resin solids in the coating composition.

If desired, the coating composition may optionally include one or more vinyl polymers. An example of a preferred vinyl polymer is an acrylic copolymer, with acrylic copolymers having pendant glycidyl groups being preferred in some embodiments. Suitable such acrylic copolymers are described in U.S. Pat. No. 6,235,102. When present, the optional acrylic copolymer is typically present in an amount from 1 to 20% by weight. Preferably, the acrylic copolymer is present in an amount from 2 to 15% by weight; more preferably, from 3 to 10% by weight; and optimally, from 5 to 10% by weight. These weight percentages are based upon the total weight of the resin solids in the coating composition.

Suitable acrylic copolymers having pendant glycidyl groups preferably contain about 30 to 80 wt-%, more preferably about 40 to 70 wt-%, and most preferably about 50 to 70 wt-%, of a monomer containing a glycidyl group. Suitable monomers containing a glycidyl group include any monomer having a carbon-carbon double bond and a glycidyl group. Typically, the monomer is a glycidyl ester of an alpha, beta-unsaturated acid, or anhydride thereof. Suitable alpha, beta-unsaturated acids include monocarboxylic acids or dicarboxylic acids. Examples of such carboxylic acids include acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof. Specific examples of monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the monomer.

It also should be pointed out that the acrylic copolymer can initially be a copolymer of an alpha, beta-unsaturated acid and an alkyl (meth)acrylate, which then is reacted with a glycidyl halide or tosylate, e.g., glycidyl chloride, to position pendant glycidyl groups on the acrylate copolymer. The alpha, beta-unsaturated carboxylic acid can be an acid listed above, for example.

In an alternative embodiment, an acrylic copolymer having pendant hydroxyl groups first is formed. The acrylic copolymer having pendant hydroxyl groups can be prepared by incorporating a monomer like 2-hydroxyethyl methacrylate or 3-hydroxypropyl methacrylate into the acrylate copolymer. The copolymer then is reacted to position pendant glycidyl groups on the acrylic copolymer.

A preferred monomer containing a glycidyl group is glycidyl (meth)acrylate.

The acrylic copolymer may optionally be formed from reactants including an alkyl (meth)acrylate having the structure: $CH_2$=C(R)—CO—$OR^6$ wherein $R^5$ is hydrogen or methyl, and $R^6$ is an alkyl group containing 1 to 16 carbon atoms. The $R^6$ group can be substituted with one or more, and typically one to three, moieties such as hydroxy, halo, amino, phenyl, and alkoxy, for example. Suitable alkyl (meth)acrylates for use in the copolymer therefore encompass hydroxy alkyl (meth)acrylates and aminoalkyl (meth) acrylates. The alkyl (meth)acrylate typically is an ester of acrylic or methacrylic acid. Preferably, $R^5$ is methyl and $R^6$ is an alkyl group having 2 to 8 carbon atoms. Most preferably, $R^5$ is methyl and $R^6$ is an alkyl group having 2 to 4 carbon atoms. Examples of the alkyl (meth)acrylate include methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, nonyl (meth)acrylates, and combinations thereof.

The acrylic copolymer preferably includes one or more vinyl comonomers such as styrene, halostyrene, isoprene, diallylphthalate, divinylbenzene, conjugated butadiene, alpha-methylstyrene, vinyl toluene, vinyl naphthalene, and mixtures thereof. Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like. In one embodiment, the acrylic copolymer is not made using styrene.

The aforementioned monomers may be polymerized by standard free radical polymerization techniques, e.g., using initiators such as peroxides or peroxy esters, to provide an acrylic copolymer preferably having an Mn of about 2,000 to 15,000, more preferably about 2,500 to 10,000, and most preferably about 3,000 to 8,000. The acrylic copolymer may be produced in situ in the presence of the polyester polymer and/or may be at least partially grafted to the polyester (e.g., via unsaturation present in the polyester such as may be introduced using maleic anhydride or the like).

The coating composition of the present disclosure may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, organic solvents, and mixtures thereof. Each optional ingredient is included in a sufficient amount to serve its intended purpose, but not in such an amount to adversely affect a coating composition or a cured coating composition resulting therefrom.

One optional ingredient is a catalyst to increase the rate of cure and/or the extent of crosslinking. Non-limiting examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, tin and zinc compounds, and combinations thereof. Examples include a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant, like a wax, which facilitates manufacture of coated articles (e.g., food or beverage can ends) by imparting lubricity to planar coated metal substrate. A lubricant is preferably present in the coating composition in an amount of about 0.1% to about 5%, and preferably about 0.3% to about 3.5%, by weight of nonvolatile material. Preferred lubricants include, for example, Carnauba wax, polyethylene-type lubricants, polytetrofluoroethylene (PTFE)-modified polyethylene lubricants, and Fisher-Tropsch lubricants.

Another useful optional ingredient is a pigment, like titanium dioxide. A pigment is optionally present in the coating composition in an amount of 0 to about 50%, by weight of nonvolatile material.

In certain preferred embodiments, the coating composition is a water-based coating composition that preferably includes at least a film-forming amount of the water-dispersible polyester polymer of the present disclosure. The coating composition preferably includes at least 30 wt-% of liquid carrier and more typically at least 50 wt-% of liquid carrier. In such embodiments, the coating composition will typically include less than 90 wt-% of liquid carrier, more typically less 80 wt-% of liquid carrier. The liquid carrier is preferably at least about 50 wt-% water, more preferably at least about 60 wt-% water, and even more preferably at least of about 75 wt-% water. In some embodiments, the liquid carrier is free or substantially free of organic solvent.

In certain preferred embodiments, the water-based coating composition is storage stable (e.g., does not separate into layers) under normal storage conditions for at least 1 week, more preferably at least 1 month, and even more preferably at least 3 months.

Other embodiments of the coating composition of the present disclosure may be solvent-based coating compositions that include, for example, no more than a de minimus amount (e.g., 0 to 2 wt-%) of water.

In some embodiments, the cured coating composition of the present disclosure preferably has a Tg of at least 20° C., more preferably at least 25° C., and even more preferably at least 30° C. In some embodiments, the Tg of the cured coating composition is preferably less than about 80° C., more preferably less than about 70° C., and even more preferably less than about 60° C.

In some embodiments, the coating composition of the present disclosure (e.g., packaging coating embodiments) prior to cure (e.g., the liquid coating composition), includes less than 1,000 parts-per-million ("ppm"), preferably less than 200 ppm, and more preferably less than 100 ppm of low-molecular weight (e.g., <500 g/mol, <200 g/mol, <100 g/mol, etc.) ethylenically unsaturated compounds.

Preferred coating compositions are substantially free of mobile bisphenol A ("BPA") and the diglycidyl ether of BPA ("BADGE"), and more preferably essentially free of these compounds, and most preferably completely free of these compounds. The coating composition is also preferably substantially free of bound BPA and BADGE, more preferably essentially free of these compounds, and optimally completely free of these compounds. In addition, preferred compositions are also substantially free, more preferably essentially free, and most preferably completely free of: bisphenol S, bisphenol F, and the diglycidyl ether of bisphenol F or bisphenol S.

In some embodiments, the polymer of the present disclosure (and preferably the coating composition) is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments.

In some embodiments, the coating composition is "PVC-free." That is, the coating composition preferably contains less than 2 wt-%, more preferably less than 0.5 wt-%, and even more preferably less than 1 ppm of vinyl chloride materials or other halogen-containing vinyl materials.

Coating compositions of the present disclosure may be prepared by conventional methods in various ways. For example, the coating compositions may be prepared by simply admixing the functionalized polymer, optional crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, functionalized polymer, optional crosslinker, and any other optional ingredients, in any desired order, with sufficient agitation. An additional amount of carrier liquid may be added to the coating compositions to adjust the amount of nonvolatile material in the coating composition to a desired level.

In some embodiments, the functionalized polymer is polymerized in organic solvent and base or acid groups present on the functionalized polymer are at least partially neutralized to disperse the polymer into aqueous medium to form a stable aqueous dispersion for further formulation.

Cured coatings of the present disclosure preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The coating composition of the present disclosure can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In an embodiment where the coating is used to coat metal sheets or coils, the coating can be applied by roll coating.

The coating composition can be applied on a substrate prior to, or after, forming the substrate into an article. In some embodiments, at least a portion of a planar substrate is coated with one or more layers of the coating composition of the present disclosure, which is then cured before the substrate is formed into an article (e.g., via stamping, drawing, draw-redraw, etc.).

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the present disclosure is a heat-curable thermoset coating composition.

The coating composition of the present disclosure may be applied, for example, as a mono-coat direct to metal (or direct to pretreated metal), as a primer coat, as an intermediate coat, as a topcoat, or any combination thereof.

Preferred coating compositions of the present disclosure formulated using the water-dispersible polyester polymer are particularly useful as adherent coatings on interior or exterior surfaces of metal packaging containers. Non-limiting examples of such articles include closures (including, e.g., internal surfaces of twist-off caps for food and beverage containers); internal crowns; two and three-piece metal cans (including, e.g., food and beverage cans); shallow drawn cans; deep drawn cans (including, e.g., multi-stage draw and redraw food cans); can ends (including, e.g., riveted beverage can ends and easy open can ends); monobloc aerosol containers; and general industrial containers, cans, and can ends; and drug cans such as metered-dose-inhaled ("MDI") cans.

The aforementioned coating compositions formulated using the water-dispersible polyester polymerare particularly well adapted for use as a coating for two-piece cans, including two-piece cans having a riveted can end for attached a pull tab thereto. Two-piece cans are manufactured by joining a can body (typically a drawn metal body) with a can end (typically a drawn metal end). In preferred embodiments, the coating compositions are suitable for use in food-contact situations and may be used on the inside of such cans. The coatings are also suited for use on the exterior of the cans. Notably, the coatings are well adapted for use in a coil coating operation. In this operation, a coil of a suitable substrate (e.g., aluminum or steel sheet metal) is first coated with the coating composition (on one or both sides), cured (e.g., using a bake process), and then the cured substrate is formed (e.g., by stamping or drawing) into the can end or can body or both. The can end and can body are then sealed together with a food or beverage contained therein.

Such coating compositions are particularly well adapted for use as an internal or external coating on a riveted beverage can end (e.g., a beer or soda can end). Preferred embodiments exhibit an excellent balance of corrosion resistance and fabrication properties (including on the harsh contours of the interior surface of the rivet to which the pull tab attaches) when applied to metal coil that is subsequently fabricated into a riveted beverage can end.

Below are some test methods useful for assessing the coating properties of certain embodiments of the coating composition of the present disclosure. The results of the below tests A-G for certain coatings prepared according to the present disclosure are presented in Table 1 below.

A. Adhesion Test

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

B. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

C. Water Pasteurization Test

This is a measure of the coating integrity of the coated substrate after exposure to heat while in contact with water. This test provides an indication of an ability of a coating to withstand conditions frequently associated with food or beverage preservation or sterilization. For the present evaluation, coated substrate samples (in the form of flat panels) were placed in a vessel and partially immersed in DI water. Testing is accomplished by subjecting the immersed coated substrate to heat of 66 C° at atmospheric pressure for a period of 90 minutes. The coated substrate was then tested for adhesion and blush as described above. In food or beverage applications requiring water pasteurization performance, adhesion ratings of 10 and blush ratings of at least 7 are typically desired for commercially viable coatings.

D. Water Retort Test

Retort performance is not necessarily required for all food and beverage coatings, but is desirable for some product types that are packed under retort conditions. For the present evaluation, coated substrate samples (in the form of flat panels) were placed in a vessel and partially immersed in DI water. While partially immersed in the test substance, the coated substrate samples were placed in a pressure cooker and subjected to heat of 121° C. above atmospheric pressure (using a pressure suitable to achieve the desired temperature) for a time period of 90 minutes. After retort, the coated substrate samples were allowed to sit for at least 2 hours before being tested for adhesion, blush resistance, or stain resistance. In food or beverage applications requiring retort performance, after retort, adhesion ratings of 10 and blush ratings of at least 7 are typically desired for commercially viable coatings.

E. Fabrication Test

This test provides an indication of the level of flexibility of a coating. Moreover, this test measures the ability of a coating to retain its integrity as it undergoes the formation process necessary to produce a food or beverage can end. In particular, it is a measure of the presence or absence of cracks or fractures in the formed end. To be suitable for food or beverage can end applications, a coating composition should preferably exhibit sufficient flexibility to accommodate the extreme contour of the rivet portion of the easy open food or beverage can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 202 standard opening riveted beverage can ends were exposed for a period of 4 seconds to an electrolyte solution comprised of 1% NaCl by weight in deionized water. Metal exposures were measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

A coating is considered herein to satisfy the Fabrication Test if it passes an electric current (after end formation) of less than about 10 milliamps (mA) when tested as described above. Preferred coating compositions for use on riveted beverage cans ends exhibit an electric current of less than 5 mA, more preferably less than 1 mA. The results of this test for certain coatings prepared according to the present disclosure are presented in Table 1—both before and after Dowfax testing.

F. Dowfax Detergent Test

The "Dowfax" test is designed to measure the resistance of a coating to a boiling detergent solution. The solution is prepared by mixing 5 ml of Dowfax 2A1 (product of Dow Chemical) into 3,000 ml of deionized water. Typically, coated substrate is immersed into the boiling Dowfax solution for 15 minutes. The coated substrate is then rinsed and cooled in deionized water, dried, and then tested and rated for blush and adhesion as described previously.

G. Solvent Resistance Test

The extent of "cure" or crosslinking of a coating is measured as a resistance to solvents such as methyl ethyl ketone (MEK). This test is performed as described in ASTM D 5402-93. The number of double rubs (i.e., one back-and-forth motion) is reported. Preferably, the MEK solvent resistance is at least 30 double rubs.

H. Feathering Test

To test feathering, a suitably sized tab (e.g., of a similar size to a soda can opening) is scored on the backside of a coated metal panel, with the coated side of the panel facing downward. The test piece is then immersed in a deionized water bath for 45 minutes at 85° C. After pasteurization, pliers are used to bend the cut tab to a 90-degree angle away from the coated side of the substrate. The test piece is then placed on a flat surface, coated side down. The cut tab is gripped using pliers and the tab is pulled from the test panel at an angle of 180 degrees until it is completely removed to create an opening. After removing the tab, any coating that extends into the opening on the test panel is measured. The largest distance that the coating extends into the opening is measured (feathering) and reported in inches. Coatings for easy-open food or beverage can ends preferably show feathering below 0.2 inches (0.508 cm), more preferably below 0.1 inches (0.254 cm), most preferably below 0.05 inches (0.127 cm), and optimally 0.02 inches or lower (0.051 cm). Preferred beverage can end coatings of the present disclosure exhibit feathering properties pursuant to the values provided above.

EXAMPLES

The disclosure is illustrated by the following examples. It is to be understood that the particular examples, materials, amounts, and procedures are to be interpreted broadly in accordance with the scope and spirit of the disclosures as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1: Preparation of a Functionalized Polymer 24.3 grams ("g") Cylohexane-1,4-dimethanol (dissolved 90% by weight in water), 101.8 g 2-Methylpropane-1,3-diol, 1.64 g 1,1,1-Trimethylolpropane, 45.4 g isophthalic acid, 135.3 g terephthalic acid, and 0.36 g of a Tin-based catalyst were charged to a 4-neck, 2-liter glass flask fitted with an electric heating mantle, a mechanical overhead stirrer, a thermocouple, a packed column (with a Dean-Stark trap and water-cooled condenser), and a stopper in the remaining neck. A flow of nitrogen gas and an agitation rate of 100-200 revolutions per minute ("rpm") were maintained throughout the process. The contents of the flask were slowly heated to 235° C. such that the head temperature at the top of the packed column was maintained at, or below, 100° C., and the water of reaction was collected in the trap and removed. Once the head temperature dropped below 80° C. and the acid number dropped below 10 mg KOH/g resin, the reaction was cooled to 180° C. 29.8 g Sebacic acid and 16.2 g of ethylene glycol were then added to the flask, and the temperature was returned to 235° C. while maintaining a head temperature below 100° C. and collecting the reaction water. Once the head temperature dropped below 80° C., the batch temperature was reduced again to 170° C. 28.5 g Maleic anhydride was added to the flask, and the temperature was held at 170° C. for 1 hour. After this hold, 21.3 g Xylene was added to the batch, the packed column was removed and the trap was prepared for azeotropic distillation. The batch was adjusted to 195-205° C. and reaction water collected until the acid number dropped below 10 mg KOH/g resin and the viscosity of a resin sample (cut to 50% non-volatile material ("NVM") in additional xylene) was U—W (Gardner-Holt bubble tube scale). Once the resin was in the correct acid number and viscosity ranges, the batch was cooled to 180° C., and 13.4 g sorbic acid was added to the flask, and the 180° C. temperature was maintained for 5 hours. Following the hold, the temperature of the batch was allowed to drop while 121.1 g Diethylene glycol monoethyl ether and 51.8 g n-Butanol were added slowly to yield a 65% NVM resin solution Example 2: Preparation of Functionalized Polymers Using Solvent-less Polymerization Processes The below Runs of Example 2 are prophetic examples that are intended to illustrate the production of polyester polymers using a representative solvent-less polymerization process. The polymers resulting from Runs 1-8 are high molecular weight polymers having a Mn between about 10,000 and about 30,000 Daltons.

Run 1

A co-polyester is prepared having a target composition of 75 mol % dimethyl terephthalate residues, 25 mol % maleic anhydride residues, and 100 mol % 1,4-cyclohexanedimethanol residues (CHDM), wherein the aforementioned mol %'s are relative to total moles of acid and acid equivalent reactants and total mole of glycol reactants.

A mixture of 56.63 g of dimethyl terephthalate, 9.5 g of maleic anhydride, and 0.0419 g of dibutyl tin oxide are placed in a 500-milliliter flask equipped with an inlet for nitrogen, a metal stirrer, and a short distillation column. The flask is placed in a Wood's metal bath already heated to 210° C. The stirring speed is set to 200 RPM throughout the experiment. The contents of the flask are heated at 210° C. for 5 minutes and then the temperature is gradually increased to 290° C. over 30 minutes. The reaction mixture is held at 290° C. for 60 minutes and then vacuum is gradually applied over the next 5 minutes until the pressure inside the flask reaches 100 mm of Hg. The pressure inside the flask is further reduced to 0.3 mm of Hg over the next 5 minutes. A pressure of 0.3 mm of Hg is maintained for a total time of 90 minutes to remove excess un-reacted diols. A high melt viscosity, visually clear and colorless polymer is obtained. This polymer has an expected inherent viscosity (IV) of 0.56 deciliters per gram ("dl/g").

Run 2

A co-polyester is prepared using the materials and methods of Run 1, except the glycol mixture is 50 mol % CHDM and 50 mol % tricyclodecane dimethanol ("TCDM") and the final has an expected IV of 0.75.

Run 3

A co-polyester is prepared using the materials and methods of Run 1, except the glycol mixture is 33 mol % CHDM, 33 mol % TCDM Alcohol and 33 mol % Methyl Propanediol and the final polymer has an expected IV of 0.76.

Run 4

A co-polyester is prepared using the materials and methods of Run 1, except the glycol mixture is 33 mol % CHDM, 33 mol % 1,3 Tetramethyl Cyclobutane Diol and 33 mol % Methyl Propanediol and the final polymer has an expected IV of 0.67.

Run 5

A co-polyester is prepared using the materials and methods of Run 1, except the glycol mixture is 50 mol % CHDM and 50 mol % 1,3 Tetramethyl Cyclobutane Diol and the final polymer has an expected IV of 0.69.

Run 6

A co-polyester is prepared using the materials and methods of Run 1, except the glycol mixture is 50 mol % TCDM and 50 mol % 1,3 Tetramethyl Cyclobutane Diol and the final polymer has an expected IV of 0.89.

In order to introduce pendant functional groups, the polyester polymers of Runs 1 to 6 are reacted with an unsaturated compound having at least one salt or salt-forming group (e.g., sorbic acid) using the process outlined above in Example 1. The level of fictionalization may be controlled by restricting the amount of the unsaturated compound having at least one salt or salt-forming group to only the amount of functionalization desired.

Run 7

The polyester polymer of Run 7 is made similar to the polymer described in Run 1. In Run 7, however, rather than discharging immediately after polymerization, the polymer melt is cooled to about 180° C. This is the minimum temperature at which the polymer melt can be satisfactorily handled due to its increased viscosity at lower temperature. Once the polymer reaches this temperature, 5.0 g (0.045 moles) of sorbic acid are added to the reaction vessel. The reaction vessel is maintained at this temperature to complete the Diels-Alder reaction between the polymer and the sorbic acid. After this holding time NMR, FT-IR and titration data are expected to indicate that 95% of the sorbic acid is bound to the backbone of the base polymer A high melt viscosity, visually clear and colorless polymer is obtained. This polymer has an expected IV of 0.56 dl/g.

Run 8

Run 8 is similar Run 7 except that 10.0 g (0.090 moles) of sorbic acid are added to the reactor. Analysis is expected to show that 97% of the sorbic acid is reacted.

The above Runs 1-8 of Example 2 illustrate that a solvent-free, melt polymerized reaction scheme may be used in some embodiments to produce functionalize polymers of the present disclosure.

The functionalized polyester polymers of Runs 1-8 may be neutralized with a suitable neutralizing agent such as a tertiary amine or ammonia and can form a stable dispersion in an aqueous carrier or a combined water and solvent carrier and can be further formulated as described herein.

Example 3: Preparation of Aqueous Dispersion Including the Functionalized Polymer The resulting solution from Example 1 was cooled to 80° C., and 26.0 g of an epoxy-functional acrylic resin was added (the epoxy-functional acrylic resin contained Glycidyl methacrylate, Styrene, and Methyl methacrylate, has an Mn of approximately 5,000 Daltons, and is cut to 51.5% NVM in organic solvent). Maintaining 80° C., 7.16 g Dimethylethanolamine were added and the resin was stirred for 5 minutes. After the 5-minute hold, 375.9 g deionized water was added to the flask over 60 minutes.

Example 4: Model Reaction to Determine Ratio of Ene and Diels-Alder Reaction Products Because it would be extremely difficult to determine the reaction mechanisms occurring in a complex maleated polyester when reacted with sorbic acid (as in Example 1), a model reaction was performed. To a 500 ml 4-neck flask equipped with an electric overhead mixing device, water cooled condenser, nitrogen inlet, and thermocouple connected to a temperature controlling device with heating mantle was added 200 parts diethyl maleate (acting as the unsaturated polyester mimic) and 78.5 parts sorbic acid. These amounts mimic the ratio of moles of sorbic acid to moles of maleic anhydride in Example 1 (0.6 to 1). Mixing was commenced at 200 rpm's and the material was heated to 180° C. over the course of 30 minutes. The material was held at 180° C. for 5 hours, at which time the material was cooled to room temperature and discharged. Using a Liquid Chromatography/Mass Spectroscopy Instrument, several reaction products were detected, all having a mass of 284.126. By analyzing the mass spectroscopic fragmentation patterns of each reaction product, it could be determined which product was the result of an Ene reaction, and which was the result of a Diels-Alder reaction. It was shown to be 75% Ene reaction, 25% Diels-Alder reaction. When the same reaction was run between diethyl maleate and crotonic acid (3-methyl acrylic acid), no reaction was observed under the test conditions. When the same reaction was run between diethyl maleate and vinyl acetic acid, an Ene reaction product was observed. Crotonic acid and vinyl acetic are incapable of undergoing a Diels-Alder reaction with diethyl maleate.

Example 5: Preparation of Coating Compositions

A clear interior beverage end lining was prepared with the following solids composition: 92.4% (by weight) of the polyester/acrylic resin dispersion from Example 3; 2.5% of a methylol functional phenol formaldehyde resin; 5% of a mixed ether melamine formaldehyde crosslinking resin; 0.1% of an amine blocked Dodecyl benzene sulfonic acid catalyst; and 1% of a carnauba lubricant in emulsion form. The final coating composition was adjusted to 33.5% NVM, of which the non-volatile component was approximately 54% water and 46% organic solvents.

Example 6: Coated Substrate

The coating composition of Example 5 was applied at a dry film weight of 6.5 to 7.5 milligrams per square inch to pretreated aluminum coil in a coil coating application. The coated coil had a 10-second dwell time in a heated oven to achieve a 465° F./241° C. peak metal temperature. The coating properties of the cured coating were assessed using various tests. The data from these tests is summarized in the below Table 1. The data of Table 1 indicates that the cured coating composition exhibits a desirable balance of coating properties for use as a coating for a riveted beverage can end. The cured coating also exhibited very good feathering resistance.

TABLE 1

| | |
|---|---|
| MEK Solvent Double Rubs | 49 |
| Water Pasteurization (45 minutes at 66° C.) | |
| Blush | 10 |
| Adhesion | 10 |
| Water Retort (90 minutes at 121° C.) | |
| Blush | 9/9 |
| Adhesion | 10/10 |
| Fabrication Test | |
| 202 Converted End Milliamps (initial) | 0.2 mA |
| 202 Converted End Milliamps (after Dowfax) | 0.6 mA |
| Coefficient of Friction (Thwing Albert) | 0.069 |

The complete disclosure of all patents, patent applications, and publications, and electronically available material cited herein are incorporated by reference. The foregoing detailed description and examples have been given for clarity of understanding only. No unnecessary limitations are to be understood therefrom. The disclosure is not limited to the exact details shown and described, for variations obvious to one skilled in the art will be included within the disclosure defined by the claims. The disclosure illustratively disclosed herein suitably may be practiced, in some embodiments, in the absence of any element which is not specifically disclosed herein.

What is claimed is:

1. A method of making a functionalized polyester polymer comprising:

providing an unsaturated precursor polyester polymer having one or more double or triple bonds; and reacting in a Diels-Alder reaction, an Ene reaction, or a combination thereof:

(i) an unsaturated compound having one or more functional groups with (ii) the unsaturated precursor polyester polymer such that a covalent attachment is formed between the unsaturated compound and the unsaturated precursor polyester polymer;

wherein the one or more functional group comprises an acid group, an isocyanate group, a blocked isocyanate group, a ketone group, or a mixture thereof; and wherein the functionalized polymer includes a backbone having one or more heteroatoms including any combination of condensation and/or step growth linkages selected from the group comprising of: amide, carbonate ester, ester, ether, imide, urea, urethane, or combinations thereof.

2. The method of claim 1, wherein the unsaturated precursor polyester polymer has a number average molecular weight of at least 4,000.

3. The method of claim 1, wherein one or both of the unsaturated precursor polyester polymer and the unsaturated compound include conjugated carbon-carbon double bonds.

4. The method of claim 1, wherein the functionalized polyester polymer resulting from the method has a glass transition temperature of at least 25° C.

5. The method of claim 4, wherein the functionalized polyester polymer resulting from the method comprises a water-dispersible polymer.

6. The method of claim 1, wherein the functionalized polyester polymer resulting from the method includes a plurality of the side groups and at least one of the side groups is a Diels-Alder reaction product and at least one of the side groups is an Ene reaction product.

7. The functionalized polyester polymer resulting from the method of claim 6.

8. A method of making a functionalized polymer comprising:

providing an unsaturated precursor polymer having a number average molecular weight of at least 2,000 and one or more double or triple bonds; and reacting in a Diels-Alder reaction, an Ene reaction, or a combination thereof: (i) an unsaturated compound having one or more functional groups with (ii) the unsaturated precursor polymer such that a covalent attachment is formed between the unsaturated compound and the unsaturated precursor polymer, wherein the unsaturated compound comprises sorbic acid or neutralized sorbic acid.

9. The method of claim 1, wherein the functionalized polyester polymer resulting from the method has a glass transition temperature of less than about 150° C.

10. The method of claim 1, wherein the functionalized polyester polymer resulting from the method has a glass transition temperature of less than about 100° C.

11. The method of claim 1, wherein the functionalized polyester polymer has a number average molecular weight of at least 5,000.

12. The method of claim 1, wherein the functionalized polyester polymer has a number average molecular weight of greater than about 10,000 to less than about 30,000.

13. The method of claim 1, wherein the unsaturated compound has an acid number of at least 40 mg KOH per gram resin.

14. The method of claim 9, wherein the unsaturated compound has an acid number of at least 40 to no greater than 100 mg KOH per gram resin.

15. The method of claim 1, wherein the functionalized polyester polymer resulting from the method is an aromatic polyester polymer.

16. The method of claim 1, wherein the functionalized polyester polymer resulting from the method is an aromatic polyester polymer that includes at least 10 wt-% of aromatic groups.

17. The method of claim 1, wherein the functionalized polyester polymer is water-dispersible.

18. The method of claim 1, wherein the unsaturated polyester precursor includes one or more unsaturated structural units provided by maleic acid or maleic anhydride.

* * * * *